United States Patent [19]

Davis

[11] Patent Number: 4,516,442
[45] Date of Patent: May 14, 1985

[54] RATCHET DEVICE

[76] Inventor: Duane L. Davis, 1225 Boston Ave., Longmont, Colo. 80501

[21] Appl. No.: 337,415

[22] Filed: Jan. 6, 1982

[51] Int. Cl.[3] ............................................. G05G 5/06
[52] U.S. Cl. .................................. 74/529; 74/577 S; 74/531; 74/576
[58] Field of Search ................. 74/529, 575, 576, 533, 74/534, 535, 536, 531, 577 S; 308/DIG. 7, D8, D9

[56] References Cited

U.S. PATENT DOCUMENTS

| | | | |
|---|---|---|---|
| 568,938 | 8/1896 | Calvert | 74/533 |
| 952,032 | 3/1910 | Fishburn | 74/577 S |
| 1,492,668 | 5/1924 | Bono | 74/576 |
| 2,079,106 | 5/1937 | Cirac et al. | 74/576 |
| 2,784,770 | 3/1957 | Herr | 74/536 |
| 2,812,961 | 11/1957 | Brown et al. | 74/529 X |
| 3,055,688 | 9/1962 | Melton et al. | 308/D7 |
| 3,106,991 | 10/1963 | Winge | 308/D7 |
| 3,195,362 | 7/1965 | Elston et al. | 74/575 |
| 3,232,136 | 2/1966 | Bahmuller | 74/533 |
| 4,038,508 | 7/1977 | Mapeloden | 74/531 |

Primary Examiner—Kenneth J. Dorner
Attorney, Agent, or Firm—Young & Martin

[57] ABSTRACT

A ratchet device is provided and includes a ratchet mechanism mounted in a housing assembly and a work arm protruding therefrom. The ratchet mechanism includes a ratchet wheel which is secured to the work arm and which is rotatably mounted on an axle and a pawl arm which is mounted at one end in the housing assembly and which is biased to engage canted ratchet teeth on the circumferential surface of the ratchet wheel. A pawl release member selectively moves the pawl arm between one position permitting engagement of its free end with the ratchet teeth and a second position disengaging the free end from the ratchet teeth. A detent is provided to maintain the pawl release member in a selected one of these positions. Preferably, the detent includes a rotatable shaft having a cam which defines the detent and a notch which receives a portion of the pawl arm to define a pawl release. The shaft is preferable oriented parallel to the axis of the axle to define a plane of symmetry. A pair of mounting members are oriented symmetrically about this plane, and the ratchet wheel is mountable in reverse orientations on the axle in correspondence to a selected mounting member to which the pawl arm is secured in order to selectively define left-handed and right-handed ratchet structures.

17 Claims, 9 Drawing Figures

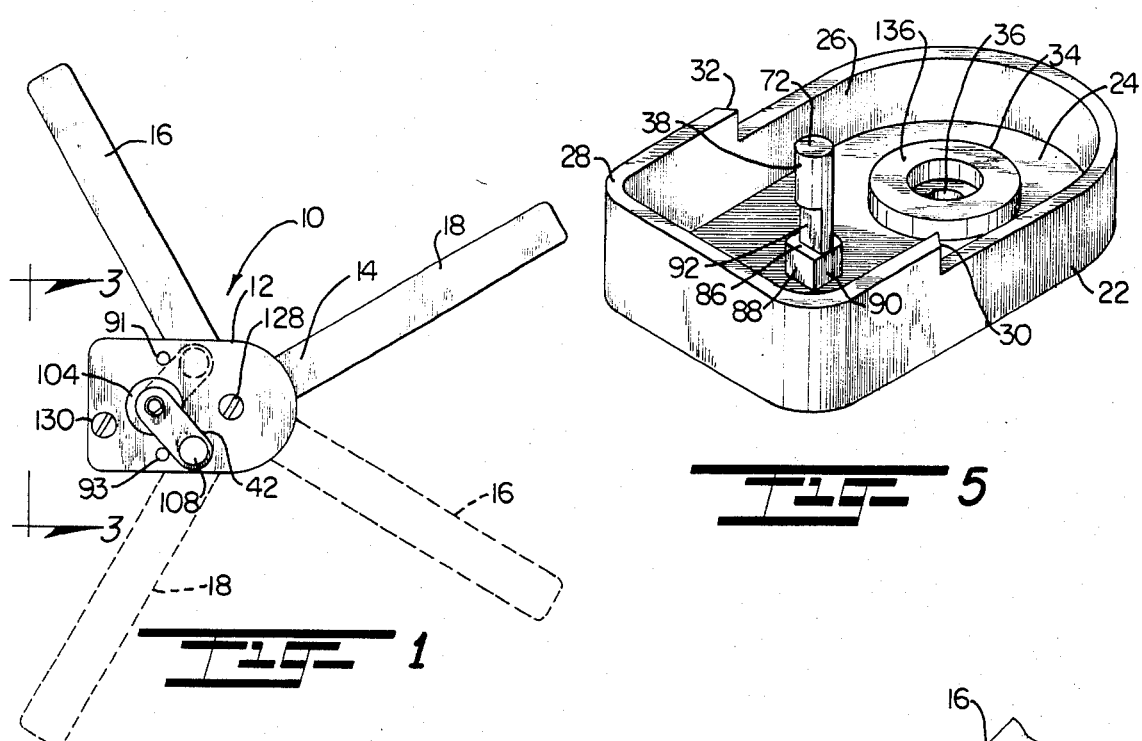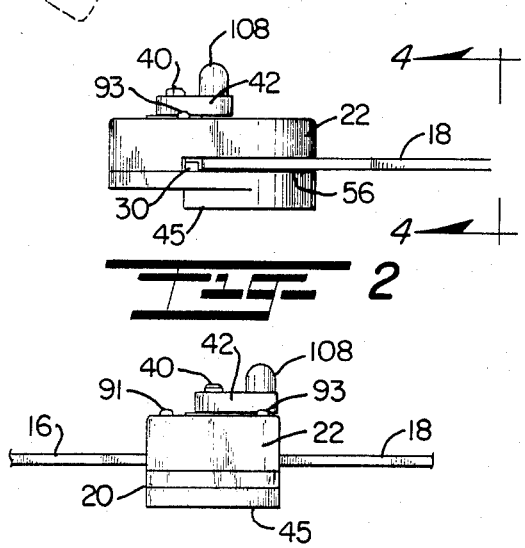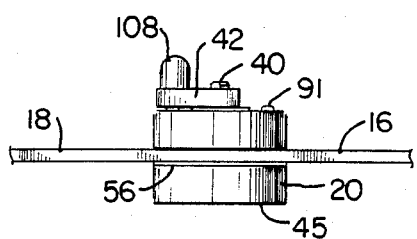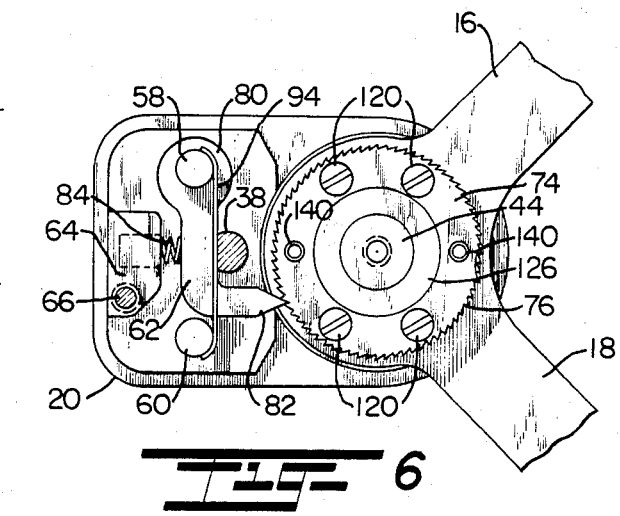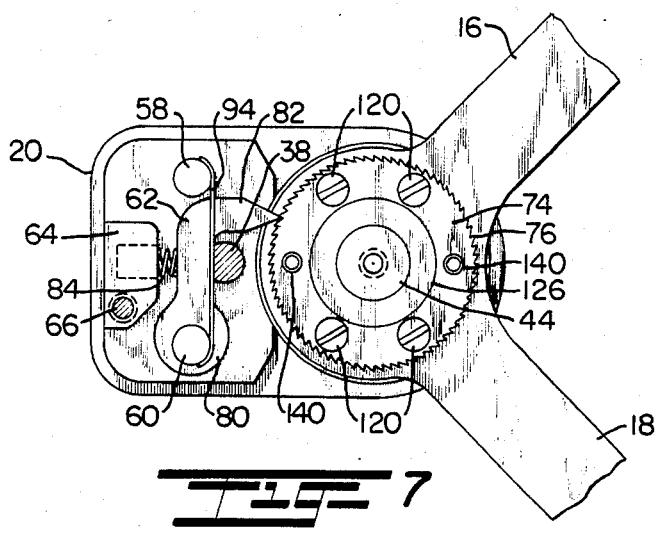

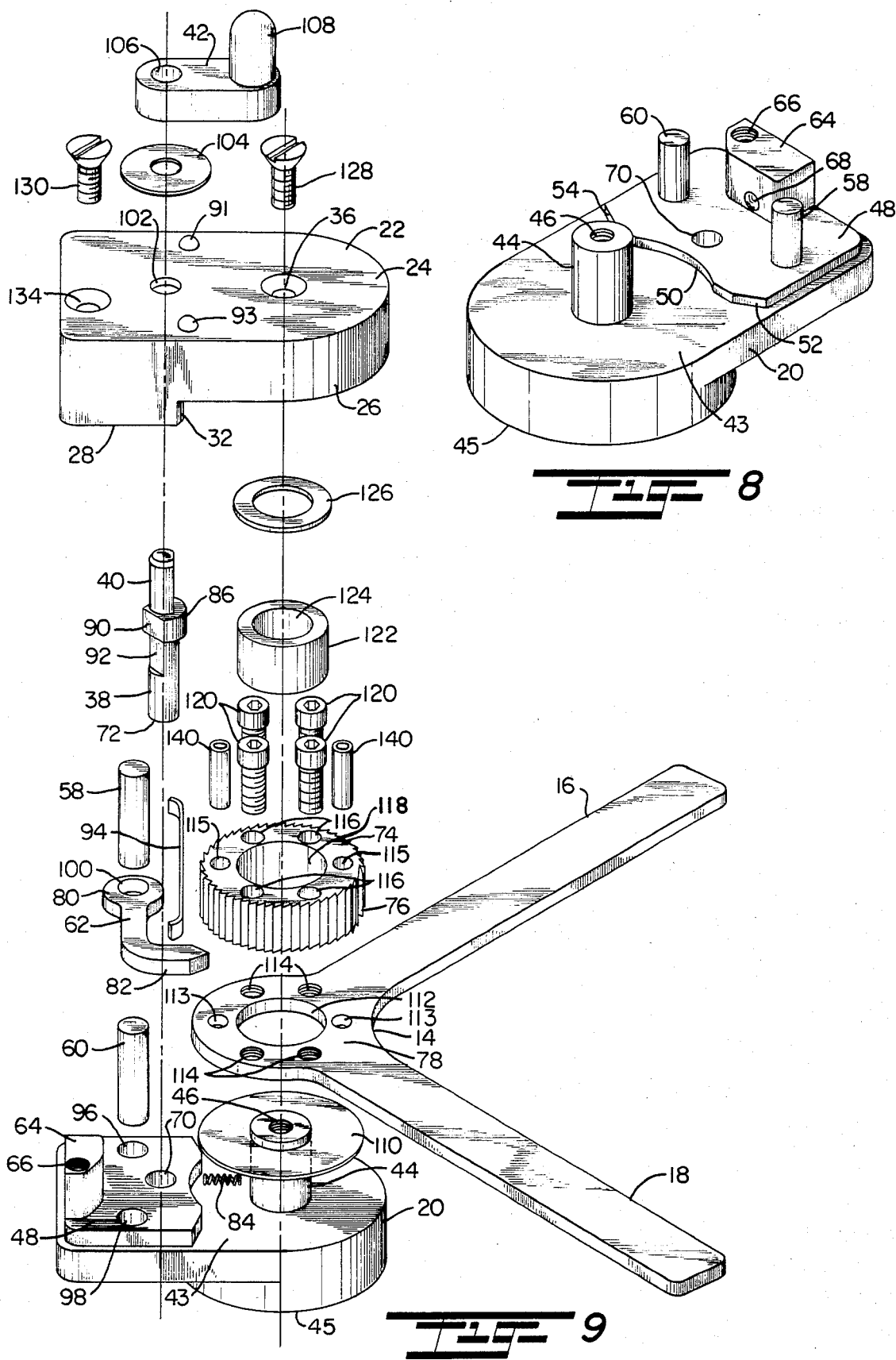

RATCHET DEVICE

BACKGROUND OF THE INVENTION

The present invention relates generally to a ratchet device, and particularly to a ratchet device adaptable to use on prosthetic devices as an aid to manually handicapped individuals.

Prosthetic devices are used to provide mechanical substitutes for lost muscle control of limbs. For example specially designed hand braces fitted on a person's arm, writs, and fingers can allow a person some limited use of hands and fingers that are paralyzed. Some of these devices are advantageously equipped with ratchet devices that allow motion in one direction, but lock against motion in the opposite direction until released. For example, such a ratchet device on a hand brace equipped with appropriate mechanical linkages and connections can assist a person's paralyzed fingers to close and lock onto an object he desires to grip and to maintain such a grip until the ratchet is released.

Prior art ratchets used for these purposes have a number of shortcomings that have not heretofore been corrected. It is common for such devices to wear out rapidly, resulting in excess play and slop in the mechanical components and to be difficult to manipulate or operate. In order to maintain maximum effectiveness and use to a handicapped person, the ratchet must be right and secure in its operating mechanism over long periods of time with minimal wear or looseness in the moving parts. Yet, the ratchet mechanism must move freely and operate easily and smoothly with a minimum of maintenance. It is also preferable that such ratchet mechanisms be small and compact, yet durable and dependable, and they should be easily adaptable to both left and right hand use.

SUMMARY OF THE INVENTION

It is an object of the present invention to provide a novel ratchet device having a simple, compact construction yet which is highly durable for prolonged use.

It is another object of the present invention to provide a ratchet device which is constructed about plane of symmetry so that common elements of the device may be reversibly mounted to reverse the direction of ratchet controlled movement.

It is a further object of the present invention to provide a ratchet device adapted to be used in the medical field, particularly on prosthetic devices for manually handicapped individuals, which ratchet device is readily adaptable to either the right or the left hand of an individual as a result of symmetrical construction.

A still further object of the present invention is to provide an easily manipulated and controlled ratchet device having a work member connectable to a prosthetic hand brace worn by a manually handicapped individual whereby use of a paralyzed hand is augmented.

To accomplish these objects, the preferred embodiment of the present invention comprises a ratchet device including a ratchet mechanism enclosed in a general open housing defined by a base member and a cover member which are securable to one another. The ratchet mechanism includes a ratchet wheel rotatably mounted in the housing assembly and having a plurality of canted circumferential teeth around its peripheral surface. A pawl arm is pivotally secured in the interior of the housing assembly and has a free end configured and biased in a direction for engaging the ratchet teeth of the ratchet wheel. A detent shaft is rotatably journaled in the housing assembly on an axis in parallel spaced apart relation to the axis of rotation of the ratchet wheel. The detent shaft interacts with the pawl arm in such a manner that selective rotation of the detent shaft in one direction permits engagement of the pawl arm with the ratchet teeth and rotation in the opposite direction disengages the pawl arm from the ratchet teeth. A work arm is secured to the ratchet wheel for common movement therewith, and the work arm extends outwardly of the housing assembly so that it may be attached to the hand or finger linkages of a prosthetic hand brace or to such other object for which controlled ratchet motion is desired.

More specifically, in the preferred embodiment of the present invention, the detent shaft and the axis of rotation of the ratchet wheel define a plane of symmetry about which the housing assembly is constructed. A pair of mounting posts for the pawl arm are provided on opposite sides of this plane of symmetry, and the pawl arm is constructed in a generally L-shaped configuration so that it is pivotally mounted at one end to a selected one of the mounting posts. The pawl arm extends through the plane of symmetry so that its free end may engage the ratchet teeth of the ratchet wheel while a mid-portion of the pawl arm is biased against the detent shaft. Preferably, this biasing is accomplished by a coil spring operating in the plane of symmetry in a radial direction with respect to the ratchet wheel. The ratchet wheel is selectively mounted on an axle in the housing assembly in either of two opposite orientations with respect to the canted ratchet teeth. These two opposite orientations respectively correspond to the symmetrical mounting posts so that the pawl arm may be pivotally connected to the ratchet post which corresponds to the orientation of the ratchet wheel. This symmetrical configuration permits construction of the ratchet device for either a "right handed" or a "left handed" ratchet motion. The detent shaft extends exteriorally of the housing assembly where a lever conductive to easy access and manipulation is attached thereto for effecting engagement or disengagement of the ratchet mechanism. Preferably, the detent shaft includes a cam actuated detent to maintain the pawl arm in either an engaged or disengaged position.

These and other objects, advantages and features of the present invention will become more readily appreciated and understood when taken together with the follow detailed description in conjunction with the accompanying drawings, in which:

BRIEF DESCRIPTION OF THE DRAWINGS

FIG. 1 is a top plan view of a ratchet device according to the preferred embodiment of the present invention;

FIG. 2 is a side view in elevation of the ratchet device shown in FIG. 1;

FIG. 3 is an end view in elevation taken about lines 3—3 of FIG. 1;

FIG. 4 is an end view in elevation taken about lines 4—4 of FIG. 2;

FIG. 5 is a view in perspective of the cover member and detent shaft according to the preferred embodiment of the present invention;

FIG. 6 is a top plan view of the ratchet mechanism and base member of the preferred embodiment of the present invention showing the ratchet wheel and pawl arm in a first orientation;

FIG. 7 is a top plan view of the base member and ratchet mechanism according to the preferred embodiment of the present invention showing the ratchet wheel and pawl arm in a reverse orientation from FIG. 6;

FIG. 8 is a perspective view of the base member according to the preferred embodiment of the present invention; and FIG. 9 is an exploded view of the ratchet device according to the preferred embodiment of the present invention.

DETAILED DESCRIPTION OF THE PREFERRED EMBODIMENT

The present invention is directed to a novel ratchet device particularly adapted to be used as an aid for manually handicapped individuals to provide some manual faculties where muscle control or motor functions are diminished. As such, the preferred form of the present device is selectively adaptable to be placed on either a left or right prosthetic hand brace of a handicapped person, and it can be used in conjunction with an orthopedic cast and the like. While ratchet devices have been well known in the past, the preferred form of the present invention is believed to be constructed in a novel fashion in that it is a simple durable structure that requires reversal of only two elements in order to adapt the device for application to either hand of an individual and this does not need separate tooling.

The ratchet device 10 of the present invention, as shown in FIG. 1, broadly includes a housing assembly 12 from which projects a work element 14 comprised of a pair of arms 16 and 18 oriented at substantially right angles to one another about a central portion 78. Work element 14 is rotatable in housing assembly 12, with this rotation being controlled by a ratchet mechanism described in greater detail below. As is shown in phantom lines in FIG. 1, work element 14 is rotatable between extreme positions which are symmetric about a plane perpendicular to housing assembly 12 and congruent with its longitudinal axis.

Housing assembly 12 is formed of a base member 20 and a cover member 22, as is shown in greater detail in FIGS. 2-5 and FIG. 8. Base member 20 and cover member 22 mate together to define housing assembly 12 so that housing assembly 12 has a generally open interior suitable for receiving the ratchet mechanism described below. Cover member 22, shown in FIG. 5, is generally cup-shaped and includes a top wall 24 and a surrounding side wall 26. The side wall 26 has a raised edge portion or ridge 28 partially therearound so that side wall 26 has a stepped configuration. Ridge 28 terminates in opposite end edges 30 and 32 which have angled end faces. Top wall 24 supports a circular raceway or compression collar 34, which surrounds an opening 36. The purpose of collar 34 and opening 36 are described below. Top wall 24 also rotatably mounts a detent shaft 38, which has an exterior portion 40 on one side of top wall 24 and an interior portion on a side of top wall 24 opposite exterior portion 40. Exterior portion 40 mounts a detent lever 42 to permit selective rotation of detent shaft 38.

Cover member 22 is adapted to be mounted on base member 20 as best shown in FIG. 9. Specifically, base member 20 is formed as a flat plate 43 having the same general shape as cover member 22. Plate 43 supports a cylindrical axle member 44, which includes an axially threaded opening 46 on its upper end, and a cylindrically shaped spacer 45 on a side opposite axle member 44 and coaxial therewith.

A generally rectangularly shaped raised plateau portion 48 is provided at an end opposite axle 44. Plateau portion 48 has an edge surface which faces axle member 44, with this surface being defined by an arcuate portion 50 and a pair of slanted edges 52 and 54 on opposite sides of arcuate edge 50. The edge surfaces of plateau portion 48 adjacent the perimeter of flat plate 43 are spaced from the perimeter of flat plate 43 a distance which corresponds to the thickness of sidewall 26 of cover member 22 and in particular to the thickness of ridge 28. Accordingly, when cover member 22 is mounted on base member 20, plateau portion 48 acts as a guide positioning cover member 22, since it fits snuggly between opposite portions of side wall 26 between surrounding ridge 28. It should be appreciated that ridge 28 abuts plate 43. Thus, the remaining edge of side wall 26 and plate 43 form a peripheral slot 56 since side wall 26 is stepped to have two different heights with respect to top wall 24. Slot 56 is bounded by edges 30 and 32 of ridge 28 and arms 16 and 18 project through slot 56 as is shown in FIGS. 2 and 4. Edges 30 and 32 cooperate with edges 52 and 54 respectively to define a limit stop for arms 16 and 18 at opposite ends of slot 56.

Base member 20 includes a pair of upwardly extending mounting posts 58 and 60 each of which is adapted to mount a pawl arm 62. Mounting posts 58 and 60 are oriented symmetrically about a plane defined by the axis of axle member 44 and a point mid-way between mounting posts 58 and 60. Further, plateau portion 48 of base member 20 supports a mounting member or block 64, which projects upwardly from plateau portion 48 in a direction corresponding to that of post 58 and 60. Block 64 intersects the above-described plane and includes a threaded opening 66 on its upper surface and a transverse opening 68 oriented generally along the plane intersected by block 44. Plateau portion 48 also includes a detent shaft alignment hole 70 positioned generally mid-way between posts 58, 60 so that it also extends generally in the above-described plane in a direction parallel to the axis of axle member 44. Hole 70 is adapted to receive the interior end 72 of detent shaft 38 to provide a rotatable support for detent shaft 38 opposite top wall 24 when cover member 22 is secured to base member 20.

It should be appreciated from the above description that, when cover member 22 is secured to base member 20, they define housing assembly 12 which has a generally open interior. A ratchet mechanism is mounted in the interior of housing assembly 12 and broadly includes pawl arm 62 mounted to a selected one of mounting posts 58, 60 and a ratchet wheel 74 which is rotatably mounted on axle member 44. Ratchet wheel 74 has a plurality of circumferential ratchet teeth 76 which are canted in an angular direction with respect to the axis of rotation of the ratchet wheel. For example, as is shown in FIG. 6, ratchet teeth 76 are canted in a clockwise angular direction and, as is shown in FIG. 7, ratchet teeth 76 are canted in a counterclockwise angular direction. Ratchet wheel 74 is connected to a central portion 78 of work element 14 for common rotation on axle member 44 by means of a plurality of screws 120 and a pair of alignment pins 140.

Pawl arm 62 has a generally L-shaped configuration including an annular end 80 and a free end 82 which is pointed and which is adapted to engage ratchet teeth 76 of ratchet wheel 74. As noted, pawl arm 62 is selectively mounted on either mounting post 58 or mounting post 60 and has a mid-portion which is biased against detent shaft 38 when cover member 22 is mounted to base member 20. Specifically, a small coil spring 84 is mounted in transverse opening 68 formed in block 64 and is compressed against the mid-portion of pawl arm 62 so that it resiliently biases free end 82 into engagement with teeth 76. Spring 84 acts in a radial direction with respect to ratchet wheel 74. Accordingly, spring 84 is generally positioned in the plane of symmetry defined by axle 44, and detent shaft 38, and the midpoint between posts 58 and 60.

Detent shaft 38 provides both a pawl release means and a detent means for the ratchet mechanism of the preferred embodiment of the present invention. Specifically, detent shaft 30 includes a detent cam member 86 which has a pair of flattened faces 88 and 90. Further, detent shaft 38 has a notch 92 which is configured to receive mid-portion of pawl arm 62. Thus, notch 92 forms a pawl release cam. Specifically, when notch 92 faces pawl arm 62, pawl arm 62 rests in notch 92 to allow free end 82 to engage ratchet teeth 76. However, when detent shaft 38 is rotated so that notch 92 no longer faces pawl arm 62, pawl arm 62 compresses spring 84, and free end 82 is disengaged from ratchet teeth 76. This rotated movement is caused by pivoting detent lever 42 to rotate detent shaft 38 between the engaged position and the disengaged position. Nubs 91 and 93 are provided on the exterior surface of top wall 24 to provide a limit stop for detent lever 42 which correspond to faces 88 and 90, respectively.

A detent means for retaining detent shaft 38 in a selected one of the engaged and disengaged positions is preferably provided by a leaf spring 94 which extends between mounting posts 58 and 60 so that spring 94 is biased against cam member 86. Leaf spring 94 resiliently and releasably retains detent shaft 38 in a selected position of rotation by its interaction with flat faces 88 and 90 on cam member 86. For example, when leaf spring 94 contacts the detent surface defined by flat face 88, leaf spring 94 retains shaft 38 in an orientation whereby pawl arm 62 is received in notch 92 to engage free end 82 with teeth 76. When leaf spring 94 contacts the detent surface defined flat face 90, leaf spring 94 resiliently retains detent shaft 38 in rotational orientation wherein pawl arm 62 is moved out of alignment with notch 92 so that free end 82 is forced out of engagement with teeth 76.

The full construction of ratchet device 10 can now be more readily appreciated and understood with reference to FIG. 9, which is an exploded view of housing assembly 12 and the ratchet mechanism contained therein. With reference to FIG. 9, it can be seen that base member 20 is provided and includes plate 43, axle member 44, spacer 45 raised plateau portion 48 and block 64. Mounting posts 58 are secured to base member 20 by mounting them in symmetrically positioned holes 96 and 98 in plateau portion 48. Spring 84 is inserted into transverse opening 68 in block 64, and pawl arm 62 is mounted to a selected one of posts 58 and 60 by mateably engaging annular end 80 with a selected one of the mounting posts. To this end, annular end 80 has a central opening 100, which is slightly larger in diameter than posts 58, 60 so that pawl arm 62 will freely pivot on the selected mounting post 58 or 60.

Detent shaft 38 is mounted to cover member 22 by passing exterior portion 40 through a hole 102 in top wall 24. A washer 104 is then placed on exterior portion 40 and detent lever 42 is mounted on exterior portion 40 so that washer 104 is sandwiched between the exterior surface of top wall 24 and detent 42. To this end, detent lever 42 is provided with a transverse bore 106, which receives exterior portion 40 of detent shaft 38 to which it is secured in a convenient manner. Further, detent lever 42 has an enlarged knob 108 at an end opposite bore 106 so that detent lever 42 may be conveniently operated to rotate detent shaft 38.

Ratchet wheel 74 and work element 14, as noted, are rotatably mounted on axle member 44. Specifically, a Teflon washer 110 is first placed on axle member 44 and then work element 14 is mounted so that washer 110 is sandwiched between central portion 78 and plate 43 of base member 20. To this end, central portion 78 of work element 14 has an enlarged circular opening 112 of slightly larger diameter than axle member 44, a pair of alignment holes 113, and four threaded openings 114 spaced along its perimeter. Ratchet wheel 74 is provided with four bores 116 which correspond in location to threaded openings 114, a large central circular hole 118 which receives axle member 44, and a pair of alignment holes 115 which correspond to holes 113 in central portion 78. Ratchet wheel 74 is thus mounted to central portion 78 by a plurality of screws 120 which pass through bore 116 and are threadably received in openings 114 securing ratchet wheel 74 to work element 14 for common rotation therewith. Further, to prevent excess play of ratchet wheel 74, pins 140 are forceably inserted through holes 115 and 113 to lock ratchet wheel 74 into position on central portion 78. It should be appreciated that ratchet wheel 74 may be mounted in either a first orientation such as that shown in FIG. 6 or an opposite or reverse orientation such as that shown in FIG. 7 depending on whether a "left hand" ratcheting or a "right hand" ratching is desired. This is discussed in greater detail below.

To provide for reduced friction motion of work element 14 and ratchet wheel 74, a cylindrical teflon washer 122 is positioned about axle member 44 and extends from washer 110 for a height corresponding to the combined thickness of central portion 78 and ratchet wheel 44. Accordingly, opening 112 and hole 118 are sized to receive the exterior diameter of washer 122 with washer 122 having a central opening 124 sized to receive axle member 44. A third teflon washer 126 is then mounted on axle member 44 above ratchet wheel 74.

With this assembly, ratchet wheel 74 and work element 14 are mounted for rotation on axle member 44. Arcuate edge 50 is provided in raised plateau portion 48 to accommodate the diameter of this assembly. Further, it should be understood that cylindrical spacer 45 has a diameter substantially the same as ratchet wheel 74 and is oriented on member 20 coaxially with ratchet wheel 74.

Leaf spring 94 is now placed in position and cover member 22 is mounted to base member 20 so that detent shaft 38 is biased against leaf spring 94. This biases pawl arm 62 against spring 84 to slightly compress spring 84. Upper end 72 of detent shaft 38 is received in hole 70 so that it is guided for rotation by hole 70 in raised plateau portion 48 and by hole 102 in cover member 22. Cover member 22 is secured to base member 20 by means of a pair of screws 128 and 130 with screw 128 extending through opening 36 in cover member 22 and being threadably received in a threaded opening 132 axially positioned in axle member 44. Screw 130 extends through an opening 134 in cover member 22 and is received in threaded opening 66 located in the upper surface of block 64. Upon such mounting, it should be noted that compression collar 34 is positioned around axle member 44 so that its upper surface 136 presses against washer 126 which in turn places friction on ratchet wheel 74 to resist rotation thereof. Accordingly, by adjusting the torque applied to screws 128 and 130, some degree of adjustment with the free rotation of ratchet wheel 74 and work element 14 can be achieved.

It should now be fully appreciated from the above description that, when ratchet device 10 is assembled, a plane of symmetry is defined by the axis of axle member 44 and the axis of detent shaft 38 also including the mid-points between mounting posts 58, 60. As such, by a simple reversal in the mounting of two elements of the ratchet mechanism, namely, pawl arm 62 and ratchet wheel 74, ratchet motion may be provided in opposite directions by the orientation of these two pieces. In FIG. 6, for example, the mounting of ratchet wheel 74 so that ratchet teeth 76 are canted in a clockwise angular direction with respect to the axis of ratchet wheel 74. The positioning of pawl arm 62 on mounting post 58 in FIG. 6 permits ratchet motion in a counterclockwise direction and prohibits motion in a clockwise direction until free end 82 is disengaged from ratchet teeth 76. Thus, mounting post 58 corresponds to the angular canting of ratchet teeth 76 in a clockwise direction. Of course, if the ratchet teeth were canted in a clockwise direction and pawl arm 62 were mounted on mounting post 60, no ratchet teeth motion would be provided since free end 82 would not engage ratchet teeth 76 and would merely ride over the surfaces of teeth 76 regardless of which angular direction ratchet wheel 74 was rotated.

Correspondingly, as is shown in FIG. 7, when ratchet teeth 76 are canted in a counterclockwise direction, which is accomplished by merely reversing or flipping ratchet wheel 74 over on work element 14, pawl arm 62 is mounted on mounting post 60 so that free end 82 engages canted ratchet teeth 76. In this reverse configuration, controlled ratchet motion is permitted in a clockwise direction and motion in a counterclockwise direction is prohibited until such time that free end 82 is disengaged from ratchet teeth 76 by rotating detent shaft 38 to pivot pawl member 62 in a direction toward block 64. Thus, mounting post 60 corresponds to the counterclockwise canting of ratchet teeth 76.

It should thus be appreciated from this description that, with the exception of the mounting of pawl arm 64 and the canting angle of ratchet teeth 76, the construction of ratchet device 10 is generally symmetrical about the plane containing the axes of axle member 44 and detent shaft 38. When pawl arm 62 is mounted on either one of the selected posts 58, 60, it extends through this plane, although spring 84 always biases its mid-portion for abutment against detent shaft 38 in a radial direction with respect to ratchet wheel 74. Thus, spring 84 generally lies in this plane of symmetry. Further, slot 56 is symmetrical amount the periphery of housing assembly 12 so that arms 16 and 18 of work element 14 may be symmetrically rotated on either side of this plane as ratchet wheel 74 is rotated on axle member 44.

Pawl release means and detent means are provided by the detent shaft generally, and specifically by notch 92 and faces 88 and 90 of cam member 86 regardless of whether pawl arm 62 is mounted on post 58 or post 60. Detent shaft 38 and notch 92 act as a second cam surface operating on pawl arm 62 to selectively engage or disengage its free end 82 from ratchet teeth 76. Since pawl arm 62 has an L-shaped configuration, the above mounting structure provides for a first leg, including the mid-portion of pawl arm 62, oriented substantially perpendicularly to the plane of symmetry and a second leg, including free end 82, mounted substantially parallel to the plane of symmetry as it engages ratchet teeth 76.

While the present invention has been described with some degree of particularity, it should be appreciated that the present invention is defined by the following claims construed in light of the prior art so that modifications or changes may be made to the preferred embodiment of the present invention without departing from the inventive concepts contained herein.

What I claim is:

1. A ratchet device comprising:
    a housing assembly having a generally open interior;
    a ratchet wheel rotatably mounted in said housing assembly, said ratchet wheel including a plurality of circumferential ratchet teeth, each said ratchet tooth being canted in an angular direction with respect to the axis of rotation of said ratchet wheel;
    a work arm secured to said wheel for common movement therewith;
    a rotatable detent shaft extending through said housing assembly in parallel spaced-apart relation to the axis of rotation of said ratchet wheel;
    an L-shaped pawl arm having a first end pivotally secured to said housing assembly lateral of the plane defined by said axis and said detent shaft, a mid-portion and a second free end adapted to engage said ratchet teeth;
    bias means associated with said pawl arm for biasing said mid-portion against said detent shaft;
    detent means associated with said detent shaft for releaseably retaining said detent shaft in a selected one of a first rotational position corresponding to a position of said pawl arm engaging said ratchet and a second rotational position corresponding to a position of said pawl arm disengaged from said ratchet; and
    a notch in said detent shaft adapted to receive the mid-portion of said pawl arm whereby said free end is engaged with said ratchet teeth when said mid-portion is received by said notch, said bias means operative to bias said mid-portion into said notch, and whereby said free end is disengaged from said ratchet teeth when said notch is rotated away from said mid-portion.

2. A ratchet device according to claim 1 including an axle member reversibly mounting said ratchet wheel in a selected one of a first orientation wherein said ratchet teeth are canted in a first angular direction and a second orientation wherein said ratchet teeth are canted in the opposite angular direction and including first and second mounting posts positioned symmetrically about said plane, each said mounting post adapted to pivotally mount said first end of said pawl arm, said first mounting post corresponding to the first orientation of said ratchet wheel and said second mounting post corresponding to the second orientation of said ratchet wheel whereby mounting of said pawl arm to said first mounting post and said ratchet wheel in said first orientation permits ratchet motion in said first angular direction and whereby mounting of said pawl arm to said second mounting post and said ratchet wheel in said second orientation permits ratchet motion in said opposite angular direction.

3. A ratchet device according to claim 1 wherein said detent means includes a leaf spring mounted in said housing assembly and a cam member having a pair of detent surfaces each corresponding to said first and second rotational positions, a mid-portiion of said leaf spring resiliently bearing against said cam member and operative to releasably retain said detent shaft in a selected one of said first and second rotational positions upon contact with the detent surface corresponding thereto.

4. A ratchet device according to claim 1 including a detent lever connected to the exterior portion of said detent shaft and operative to rotate said detent shaft between said first and second rotational positions and including limit stop means associated with said detent lever for constraining rotational movement of said detent shaft between said first and second rotational positions.

5. A ratchet device comprising:
a housing assembly having a generally open interior;
an axle member mounted to said housing assembly in the interior thereof and defining an axis of rotation;
first and second mounting members positioned in said interior in spaced-apart relation to one another, said mounting members oriented symmetrically about a plane defined by the axis of said axle member and a mid-point between said first and second mounting members whereby said first mounting member is positioned on a first side of said plane and said second mounting member is positioned on a second side of said plane, said mounting member being first and second posts oriented along axes parallel to said axis of rotation, said pawl member being L-shaped in configuration and having an annular end opposite said free end and a mid-portion, said annular end being received on a selected one of said posts, said pawl arm passing through said plane;
a circular ratchet wheel mounted on said axle for rotation in said housing assembly, said ratchet wheel including a plurality of circumferential ratchet teeth, each said ratchet tooth being canted in an angular direction with respect to said axis, said ratchet wheel being selectively mountable on said axle in one of a first orientation wherein said ratchet teeth are canted in a first angular direction and a second orientation wherein said ratchet teeth are canted in an opposite angular direction;
a pawl member selectively mounted to one of said first and second mounting members and having a free end adapted for engaging said ratchet teeth, the selective mounting of said pawl member to one of said first and second mounting members corresponding to the first and second orientation of said ratchet wheel;
bias means associated with said pawl member for biasing said free end into engagement with said ratchet teeth; and
a rotatable detent shaft extending into the interior of said housing assembly between the mid-portion of said pawl member and said ratchet wheel, said detent shaft having a notch adapted to receive the mid-portion of said pawl arm whereby said free end is engaged with said ratchet teeth when said mid-portion is received by said notch and whereby said free end is disengaged from said ratchet teeth when said notch is rotated away from said mid-portion.

6. A ratchet device according to claim 5 wherein said bias means includes a spring mounting member oriented in said plane and a spring supported by said spring mounting member and oriented generally in said plane, said spring operative to exert resilient force on the mid-portion of said pawl member in a radial direction with respect to said ratchet wheel.

7. A ratchet device according to claim 5 including releaseable detent means associated with said pawl release means for releasably retaining said detent shaft in a selected one of a first rotational position wherein said free end is engaged with said ratchet teeth and a second rotational position wherein said free end and said ratchet teeth are disengaged.

8. A ratchet device according to claim 7 wherein said detent means includes a leaf spring extending between said first and second posts and a cam member on said detent shaft adjacent said notch, said cam member having a pair of cam surfaces each corresponding to one of said first and second rotational positions, said leaf spring resiliently bearing against said cam member.

9. A ratchet device according to claim 8 wherein said detent shaft has an exterior portion thereof extending exteriorly of said housing assembly and including a detent lever connected to said exterior portion and operative to rotate said detent shaft between said first and second rotational positions.

10. A ratchet device according to claim 9 wherein said detent shaft is positioned substantially in said plane.

11. A ratchet device according to claim 5 wherein said pawl member has a first leg oriented substantially parallel to said plane and a second leg oriented substantially perpendicularly to said plane.

12. A ratchet device according to claim 5 including a work member secured to said ratchet wheel, said housing assembly having a slot therein, said work member protruding through said slot exteriorly from said housing assembly.

13. A ratchet device according to claim 12 wherein said slot extends symmetrically about said plane.

14. A ratchet device according to claim 12 wherein said work member includes a pair of work arms oriented at approximately a right angle with respect to one another.

15. A ratchet device according to claim 5 wherein said housing assembly includes a base member and a cover member securable to one another, said axle member being mounted to one of said base and cover members and a compression collar being positioned on the other of said base and cover members, said collar oriented in surrounding relation to said axle member when said base and cover members are secured to one another.

16. A ratchet device according to claim 15 including a cylindrical teflon bearing on said axle member and supporting said ratchet wheel for rotation thereon, a first teflon washer positioned on said axle member between said ratchet wheel and said base member and a second teflon washer positioned on said axle member between said ratchet wheel and said cover member, said compression collar sized for bearing against a respective one of said teflon washers and operative to apply frictional force resisting rotation of said ratchet wheel when said base and cover members are secured to one another.

17. A ratchet device according to claim 15 including an outwardly projecting spacer element on the exterior surface of said housing assembly on one of said base and cover members.

* * * * *